United States Patent [19]

Fleming

[11] Patent Number: 4,725,361
[45] Date of Patent: Feb. 16, 1988

[54] PROCESS FOR REMOVAL OF TRIHALOCARBONS FROM WATER

[75] Inventor: Hubert L. Fleming, Mars, Pa.

[73] Assignee: Aluminum Company of America, Pittsburgh, Pa.

[21] Appl. No.: 912,387

[22] Filed: Sep. 26, 1986

Related U.S. Application Data

[63] Continuation-in-part of Ser. No. 795,907, Nov. 7, 1985.

[51] Int. Cl.[4] ................................................ C02F 1/28
[52] U.S. Cl. ...................................... 210/673; 210/691
[58] Field of Search ............... 55/71, 75, 389; 502/63, 502/64, 415; 210/673, 691, 502.1, 503

[56] References Cited

U.S. PATENT DOCUMENTS

| | | | |
|---|---|---|---|
| 3,130,007 | 4/1964 | Breck | 23/113 |
| 3,732,326 | 5/1973 | Chen | 210/691 |
| 3,899,310 | 8/1975 | Chi et al. | 55/71 |
| 3,917,544 | 11/1975 | Michel | 252/455 Z |
| 4,374,654 | 2/1983 | McCoy | 55/71 |
| 4,549,966 | 10/1985 | Beall | 210/691 |

FOREIGN PATENT DOCUMENTS 1491563  11/1977  United Kingdom .

OTHER PUBLICATIONS

Bouwer et al., "Removal of Trace Chlorinated Organic Compounds by Activated Carbon Fixed-Film Bacteria", Environ. Sci. Technol., vol. 16, No. 12, 1982, pp. 836–843.

Kelleher et al., "Investigation of Volatile Organics Removal", Journal of New England Water Works Association, 95, No. 2, 1981, pp. 119–133.

Primary Examiner—Ivars Cintins
Attorney, Agent, or Firm—Glenn E. Klepac

[57] ABSTRACT

Water contaminated with a trihalocarbon is passed through a first or second bed containing particles of an activated composite adsorbent comprising alumina and zeolite. The trihalocarbon is adsorbed onto the particles, thereby reducing trihalocarbon concentration in the water. The adsorbed trihalocarbon is reacted with air or steam at an elevated temperature in order to regenerate the adsorbent particles for reuse. Gaseous HCl produced in the reaction with air or steam may be adsorbed in a third bed containing adsorbent agglomerates.

18 Claims, 1 Drawing Figure

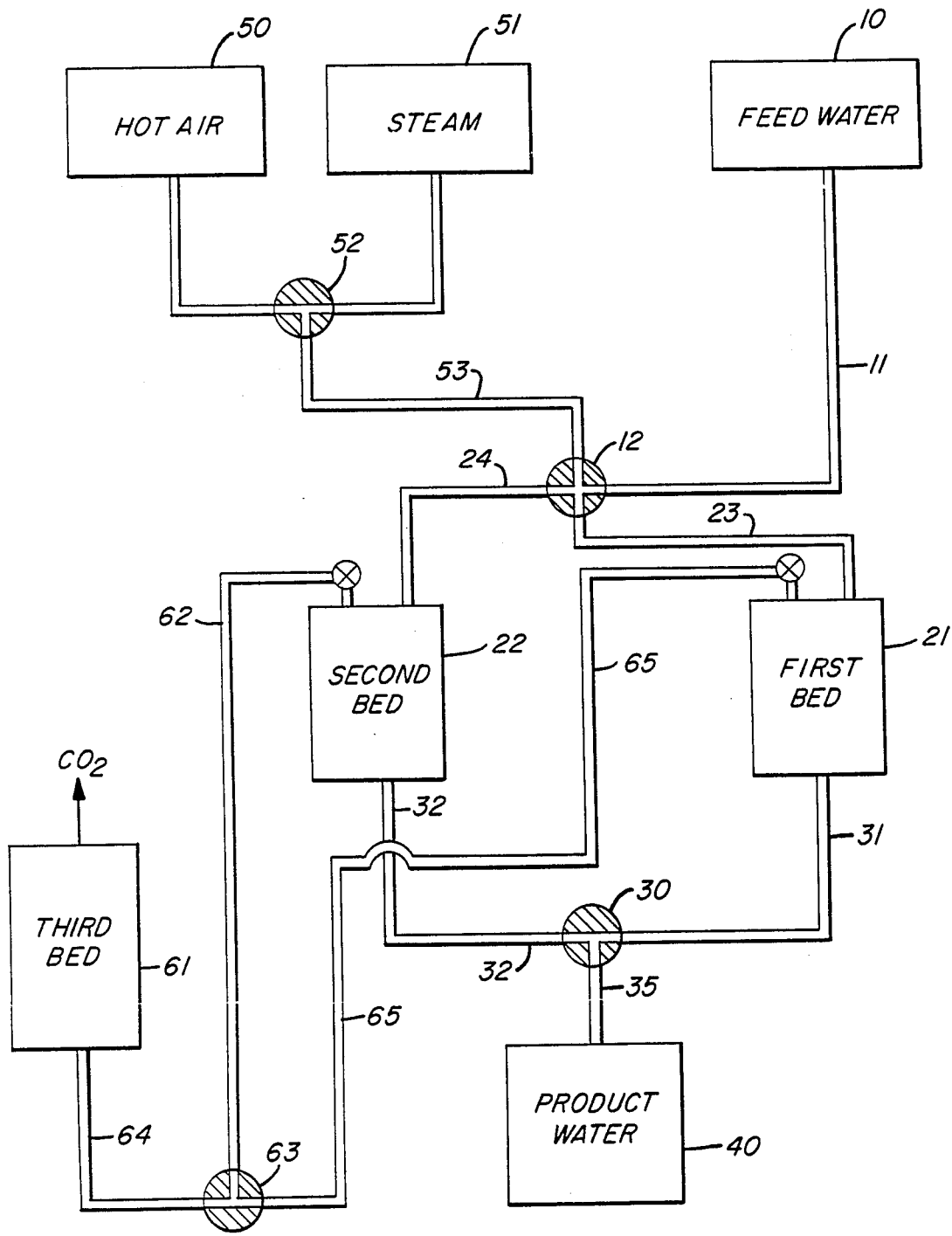

PROCESS FOR REMOVAL OF TRIHALOCARBONS FROM WATER

REFERENCE TO RELATED APPLICATION

This application is a continuation-in-part application of Goodboy et al U.S. Ser. No. 795,907, filed Nov. 7, 1985.

BACKGROUND OF THE INVENTION

The present invention relates to processes for removal of trihalocarbons from water. More specifically, the invention relates to a process for removing compounds such as trichloroethane, trichloroethylene, and dichlorobromomethane from groundwater and to a novel adsorbent and apparatus for carrying out the process.

In the prior art, activated carbon has been used as an adsorbent to remove trihalocarbons from water. Although activated carbon is an effective adsorbent, the adsorption process is difficult to employ on a commercial scale because attempts to regenerate the adsorption bed with steam result in incomplete destruction of the trihalocarbon. Although hot air can be used to oxidize the adsorbed compounds, the hot air also reacts with activated carbon to destroy the bed. Because activated carbon is so difficult to regenerate, it is generally disposed of as waste material after being used.

A principal object of the present invention is to provide a process for adsorbing trihalocarbons from water onto particles contained in an adsorption bed, wherein the adsorbent can be regenerated with air or steam at an elevated temperature to chemically degrade the trihalocarbon without destroying the bed.

A related object of the present invention is to provide a process for preventing release to the atmosphere of gaseous HCl produced during regeneration of the adsorption bed.

A further object of the invention is to provide a novel composite adsorbent and a novel apparatus for carrying out the adsorption process of the invention.

Additional objects and advantages of the present invention will become apparent to persons skilled in the art from the following detailed description.

SUMMARY OF THE INVENTION

In accordance with the present invention, there is provided a process for treating water to remove a trihalocarbon contaminant comprising the steps of:

(a) passing water contaminated with a trihalocarbon through a first or second bed containing particles of an activated composite adsorbent comprising about 50–95 wt% alumina and about 5–50 wt% zeolite, thereby to adsorb the trihalocarbon onto said particles and to reduce trihalocarbon concentration in the water, and (b) reacting the adsorbed trihalocarbon with air or steam or mixtures thereof at an elevated temperature, thereby to produce gaseous $CO_2$ and HCl and to regenerate adsorbent particles in the first bed for reuse in step (a).

The trihalocarbon may comprise at least one compound selected from the group consisting of 1,1,1-trichloroethane, trichloroethylene, and dichlorobromomethane. The process is also suitable for adsorption and chemical degradation of other trihalocarbons including chloroform, fluorochlorocarbons, fluorobromocarbons, trifluorocarbons such as trifluoroethylene, and other hydrocarbons substituted with a total of three chlorine, fluorine, bromine, or iodine atoms or mixtures of such atoms. The water usually initially contains up to about 5,000 ppb of the trihalocarbon prior to the process. The treated water generally contains less than about 5 ppb of the trihalocarbon.

The zeolite preferably comprises sodium Y zeolite having a sufficiently low sodium silicate content that a 20 wt% aqueous slurry has a pH of less than about 10.42. A preferred adsorbent comprises about 60–90 wt% alumina and about 10–40 wt% sodium Y zeolite wherein the molar ratio of $SiO_2$ to $Al_2O_3$ is about 4.5–6.0. More preferably, the adsorbent comprises about 70–80 wt% alumina and about 20–30 wt% zeolite. In a preferred zeolite, the molar ratio of $SiO_2$ to $Al_2O_3$ is about 4.8–6.0. A particularly preferred molar ratio is about 5.3–5.5.

The adsorbent is produced by admixing particles of activated alumina and sodium Y zeolite, agglomerating the particles into a composite agglomerate, aging the agglomerate in the presence of water, activating at an elevated temperature, and then crushing to a desired particle size.

The adsorbent preferably has an average particle size of about 25–250 microns, more preferably about 50–200 microns. Average pore size is generally about 60–80 angstroms. The adsorbent usually has average pore volume of about 0.5–0.8 $cm^3/g$, surface area greater than about 200 $m^2/g$, and LOI less than about 3 wt%.

Step (b) of the process outlined above may comprise reacting the trihalocarbon with air at a temperature of about 150°–500° C. or with steam at a temperature of less than about 500° C. When air is used, the temperature is preferably about 250°–400° C. A preferred steam temperature is about 100°–300° C.

The gaseous HCl produced in step (b) may be adsorbed in a third bed containing agglomerates of a composite adsorbent. The adsorbent agglomerates comprise about 50–95 wt% alumina and about 5–50 wt% sodium Y zeolite wherein the molar ratio of $SiO_2$ to $Al_2O_3$ is about 4.5–6.0. The adsorbent is produced by admixing particles of activated alumina and sodium Y zeolite having sufficiently low sodium silicate content that a 20 wt% aqueous slurry of the zeolite has a pH of less than about 10.42, agglomerating the particles into a composite agglomerate, aging the agglomerate in the presence of water, and activating at an elevated temperature. The adsorbent is preferably produced by admixing about 70–80 wt% activated alumina particles and about 20–30 wt% sodium Y zeolite wherein the molar ratio of $SiO_2$ to $Al_2O_3$ is about 4.8–6.0.

BRIEF DESCRIPTION OF THE DRAWING

The sole Figure is a schematic diagram of an apparatus illustrating the process of the present invention.

DETAILED DESCRIPTION OF A PREFERRED EMBODIMENT

An apparatus for carrying out the process of the present invention is shown schematically in the drawing. The apparatus includes a tank 10 holding feed water contaminated with a trihalocarbon and a first conduit or conduit means 11 leading from the tank 10 to a four-way valve or first valve means 12.

The apparatus further comprises a first bed 21 containing adsorbent particles, a second bed 22 also containing adsorbent particles, a first line 23 leading from the valve 12 to the first bed 21, and a second line 24 leading from the valve 12 to the second bed 22. Water treated in the beds 21, 22 is carried to a three-way valve or valve means 30 by a first water pipe 31 leading from the first bed 21 or a second water pipe 32 leading from the second bed 22. The treated water is carried by a water line 35 to a product storage tank 40. The treated water may then be consumed or discharged into a river, pond, or other body of water.

The adsorbent beds 21, 22 can be regenerated by hot air or steam. An air source tank 50 and a steam source tank 51 are each connected to a three-way valve or second valve means 52. A second conduit or conduit means 53 carries either hot air or steam from the air tank 50 or steam tank 51 to the first valve means 12.

In the apparatus illustrated, feed water is carried from the tank 10 through the first conduit means 11, first valve means 12, and line 23 into the first bed 21. Trihalocarbons are there adsorbed onto adsorbent particles, and treated water is removed through a pipe 31, valve 30, and conduit 35 to the product storage tank 40.

At the same time that water is being treated in the first bed 21 steam is carried to the second bed 22, there reacting with the adsorbed trihalocarbon to produce gaseous $CO_2$ and HCl. After the reaction is complete, the adsorbent particles are suitable for reuse in adsorbing trihalocarbons from the feed water.

Gaseous HCl and $CO_2$ produced in the second bed 22 are carried to a third bed 61 for removal of HCl. The gases are transferred through a second gas line 62, three-way valve 63, and gas supply line 64. Similarly, a first gas line 65 transfers gaseous HCl and $CO_2$ from the first bed 21 to the three-way valve 63, gas supply line 64, and third bed 61.

Steam from the steam source 51 has a pressure of about 80–100 psi and a temperature of about 200° C. When hot air is used as the regenerating gas, it preferably has a temperature of about 300° C.

The first bed 21 and second bed 22 each contain particles of an activated composite adsorbent comprising about 75 wt% alumina and about 25 wt% sodium Y zeolite. The adsorbent is produced in a process requiring several steps. Particles of activated alumina having an average particle size of about 4.5–5 microns are mixed with sodium Y zeolite particles having an average size of about 3–5 microns. The zeolite should have a molar ratio of $SiO_2$ to $Al_2O_3$ of about 4.8–6.0, preferably about 5.2–5.3. The Y zeolite is desirably more than about 95% crystalline. In other words, the material is less than about 5% amorphous, as measured by X-ray diffraction.

Sodium content of the sodium Y zeolite (measured as $Na_2O$) is desirably at least about 12.7 wt% and preferably at about the maximum theoretical level. Sodium silicate content should be sufficiently low that a 20 wt% aqueous slurry of the zeolite particles has a pH of less about 10.42. The pH is preferably about 10.2–10.3.

About 75 wt% of the activated alumina and about 25 wt% sodium Y zeolite are mixed together and ball formed (agglomerated) in the presence of water and then exposed to steam. The resulting agglomerates containing about 30–40 wt% water are then aged at about 30° C. for about 2–4 hours. Aging is performed at a pH of greater than 7. It is undesirable to perform the aging step at greater than 80° C.

The aged agglomerates are tunnel activated in a roll kiln that is divided into zones having increasing temperature. After about two hours, the agglomerates reach a final temperature of about 450° C. The agglomerates are then removed from the kiln and cooled.

The agglomerates are then crushed into particulate form and sieved to a desired particle size. A preferred particulate adsorbent has $-28+48$ mesh size (Tyler series) and a bulk density of about 30–45 lb/ft$^3$.

The composite adsorbent used in the third bed 61 has a similar chemical composition. However, this adsorbent is not crushed into particles but rather is used as a ball formed agglomerate having diameters ranging from about 1/16 inch to about ¼ inch. A preferred spherical agglomerate having 3/16 inch diameter has about 450 m$^2$/g surface area, 0.6 cc/g total pore volume, crushed strength of about 25 lbs. (11.4 kg), and bulk density of about 42 lb/ft$^3$ (0.67 g/cm$^3$)

Additional details concerning preparation and composition of the composite adsorbents used in practicing the present invention are disclosed in U.S. patent application Ser. No. 795,907 filed Nov. 7, 1985. The disclosure of said application is incorporated herein by reference to the extent not inconsistent with the present invention.

The process of the present invention has been found effective in removing trihalocarbons from groundwater. For example, groundwater containing greater than about 50 ppb of trihalocarbons has been treated to reduce trihalocarbon concentration to less than about 5 ppb. A bed containing about 500 lbs. of the particulate adsorbent is effective to treat about 1 gallon of groundwater per minute. Expected lifetime of the particulate adsorbent is about one year.

Each bed is used to adsorb trihalocarbon contaminants from groundwater until the bed approaches its saturation capacity of about 0.2–0.5 mg trihalocarbon per gram of the adsorbent, then cycled for desorption by treatment with steam. At a 1 gallon per minute flow rate, a typical adsorption contact time is about 20 minutes, and typical regeneration time is about 4 hours.

Adsorption capacity of the beds is lowered by the presence of high concentrations of salts such as sulfates, chlorides, and phosphates. However, even under such adverse conditions, the adsorbent retains its selectivity for trihalocarbons and will still function, although at shorter cycle times.

Eventually after repeated use, a carbonaceous residue is deposited onto the composite adsorbent particles so that the adsorbent must be replaced. Expected average lifetime of the particulate adsorbent is about one year.

While the invention has been described in terms of preferred embodiments, the claims appended hereto are intended to encompass all embodiments which fall within the spirit of the invention.

What is claimed is:

1. A process for treating water to remove a trihalocarbon contaminant comprising the steps of:
   (a) passing water contaminated with a trihalocarbon through a bed containing particles of an activated composite adsorbent comprising about 50–95 wt% alumina and about 5–50 wt% zeolite, thereby to adsorb the trihalocarbon onto said particles and to reduce trihalocarbon concentration in the water, and
   (b) reacting the adsorbed trihalocarbon with air or steam or mixtures thereof at an elevated temperature, thereby to produce gaseous $CO_2$ and HCl and to regenerate adsorbent particles in the bed.

2. The process of claim 1 wherein said trihalocarbon comprises at least one compound selected from the group consisting of 1,1,1-trichloroethane, trichloroethylene, and dichlorobromomethane.

3. The process of claim 1 wherein the water contains up to about 5,000 ppb of the trihalocarbon prior to step (a).

4. The process of claim 1 wherein the water contains less than about 5 ppb of the trihalocarbon after step (b).

5. The process of claim 1 wherein the zeolite comprises sodium Y zeolite having a sufficiently low sodium silicate content that a 20 wt% aqueous slurry has a pH of less than about 10.42.

6. The process of claim 1 wherein the adsorbent comprises about 60–90 wt% alumina and about 10–40 wt% sodium Y zeolite wherein the molar ratio of $SiO_2$ to $Al_2O_3$ is about 4.5–6.0.

7. The process of claim 6 wherein the adsorbent comprises about 70–80 wt% alumina and about 20–30 wt% zeolite.

8. The process of claim 1 wherein the adsorbent is produced by admixing particles of activated alumina and sodium Y zeolite, agglomerating the particles into a composite agglomerate, aging said agglomerate in the presence of water, activating at an elevated temperature, and then crushing said agglomerate to obtain average particle size of about 25–250 microns.

9. The process of claim 1 wherein the average particle size of the adsorbent is about 25–250 microns.

10. The process of claim 1 wherein the adsorbent has an average pore size of about 60–80 angstroms.

11. The process of claim 1 wherein the adsorbent has an average pore volume of about 0.5–0.8 cm$^3$/g, surface area greater than about 200 m$^2$/g, and LOI less than about 3 wt%.

12. The process of claim 1 wherein step (b) comprises reacting the trihalocarbon with air at a temperature of about 150°–500° C.

13. The process of claim 12 wherein the air has a temperature of about 250°–400° C.

14. The process of claim 1 wherein step (b) comprises reacting the trihalocarbon with steam at a temperature of less than about 500° C.

15. The process of claim 1 wherein step (b) comprises reacting the trihalocarbon with steam at a temperature of about 100°–300° C.

16. The process of claim 1 further comprising:
(c) passing the gaseous HCl produced in step (b) into a bed containing agglomerates of a composite adsorbent comprising about 50–95 wt% alumina and about 5–50 wt% sodium Y zeolite wherein the molar ratio of $SiO_2$ to $Al_2O_3$ is about 4.5–6.0, said adsorbent being produced by admixing particles of activated alumina and sodium Y zeolite having sufficiently low sodium silicate content that a 20 wt% aqueous slurry of said zeolite has a pH of less than about 10.42, agglomerating the particles into a composite agglomerate, aging said agglomerate in the presence of water and activating at an elevated temperature.

17. The process of claim 1 wherein said adsorbent agglomerates comprise about 70–80 wt% activated alumina and about 20–30 wt% sodium Y zeolite wherein the molar ratio of $SiO_2$ to $Al_2O_3$ is about 4.8–6.0.

18. The process of claim 1 further comprising:
(c) passing water contaminated with a trihalocarbon through the bed regenerated in step (b), thereby to adsorb the trihalocarbon onto the regenerated adsorbent particles and to reduce trihalocarbon concentration in the water.

* * * * *